(12) United States Patent
Peeno et al.

(10) Patent No.: US 9,546,908 B1
(45) Date of Patent: Jan. 17, 2017

(54) GLASSWARE MOLD PYROMETRY

(71) Applicant: Owens-Brockway Glass Container Inc., Perrysburg, OH (US)

(72) Inventors: Joshua D. Peeno, Maumee, OH (US); Gregory W. Nafziger, Archbold, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 28 days.

(21) Appl. No.: 14/573,847

(22) Filed: Dec. 17, 2014

(51) Int. Cl.
*C03B 9/353* (2006.01)
*G01J 5/02* (2006.01)

(52) U.S. Cl.
CPC . *G01J 5/02* (2013.01); *C03B 9/353* (2013.01)

(58) Field of Classification Search
CPC ....... C03B 9/353; C03B 9/3816; C03B 9/3875
See application file for complete search history.

(56) References Cited

U.S. PATENT DOCUMENTS

| | | | |
|---|---|---|---|
| 1,232,408 A | 7/1917 | Thwing | |
| 3,333,765 A | 8/1967 | Champlin | |
| 3,666,433 A * | 5/1972 | Nebelung | C03B 9/3532 65/158 |
| 3,810,747 A | 5/1974 | Bork | |
| 4,104,046 A | 8/1978 | McCreery | |
| 4,185,982 A | 1/1980 | Schwenninger | |
| 4,519,827 A * | 5/1985 | Jones | C03B 9/3816 65/162 |
| 4,548,633 A | 10/1985 | Nebelung | |
| 4,576,486 A | 3/1986 | Dils | |
| 4,750,139 A | 6/1988 | Dils | |
| 4,794,619 A | 12/1988 | Tregay | |
| 4,845,647 A | 7/1989 | Dils et al. | |
| 4,906,106 A | 3/1990 | Kaufmann et al. | |
| 5,099,681 A | 3/1992 | Dils | |
| 5,112,137 A | 5/1992 | Wickersheim et al. | |
| 5,167,688 A | 12/1992 | Cavazos | |
| 5,183,338 A | 2/1993 | Wickersheim et al. | |
| 5,255,980 A | 10/1993 | Thomas et al. | |
| 5,277,496 A | 1/1994 | Mayer et al. | |
| 5,364,186 A | 11/1994 | Wang et al. | |

(Continued)

FOREIGN PATENT DOCUMENTS

| | | |
|---|---|---|
| EP | 0121335 | 10/1984 |
| FR | 2938254 A1 | 5/2010 |

(Continued)

OTHER PUBLICATIONS

PCT International Search Report and Written Opinion, Int. Serial No. PCT/US2015/066309, Int. Filing Date: Dec. 17, 2015, Applicant: Owens-Brockway Glass Container Inc., Mail Date: May 30, 2016.

*Primary Examiner* — Queenie Dehghan

(57) ABSTRACT

An apparatus to sense temperature in a glassware forming machine. A mold body includes an exterior surface, a mold cavity having an interior mold surface, and a blind hole having a closed end including a closed end surface adjacent to and spaced outwardly from the interior mold surface, wherein the blind hole extends outwardly from the closed end surface toward the exterior surface. The mold body is removably carried on a mold hanger, and a light collector is carried by the mold hanger to collect infrared light emitted within the blind hole.

18 Claims, 1 Drawing Sheet

(56) References Cited

U.S. PATENT DOCUMENTS

| | | | |
|---|---|---|---|
| 6,226,453 B1 | 5/2001 | Yam et al. | |
| 6,746,149 B1 * | 6/2004 | Chubb | G01J 1/58 374/131 |
| 7,698,907 B1 | 4/2010 | Hayes et al. | |
| 7,836,773 B2 | 11/2010 | Sakamoto et al. | |
| 2003/0028345 A1 | 2/2003 | Watkins et al. | |
| 2012/0261850 A1 | 10/2012 | Simon | |

FOREIGN PATENT DOCUMENTS

| | | |
|---|---|---|
| GB | 2136114 A | 9/1984 |
| JP | S63206319 A | 8/1988 |
| WO | WO 2009/106689 | 9/2009 |

* cited by examiner

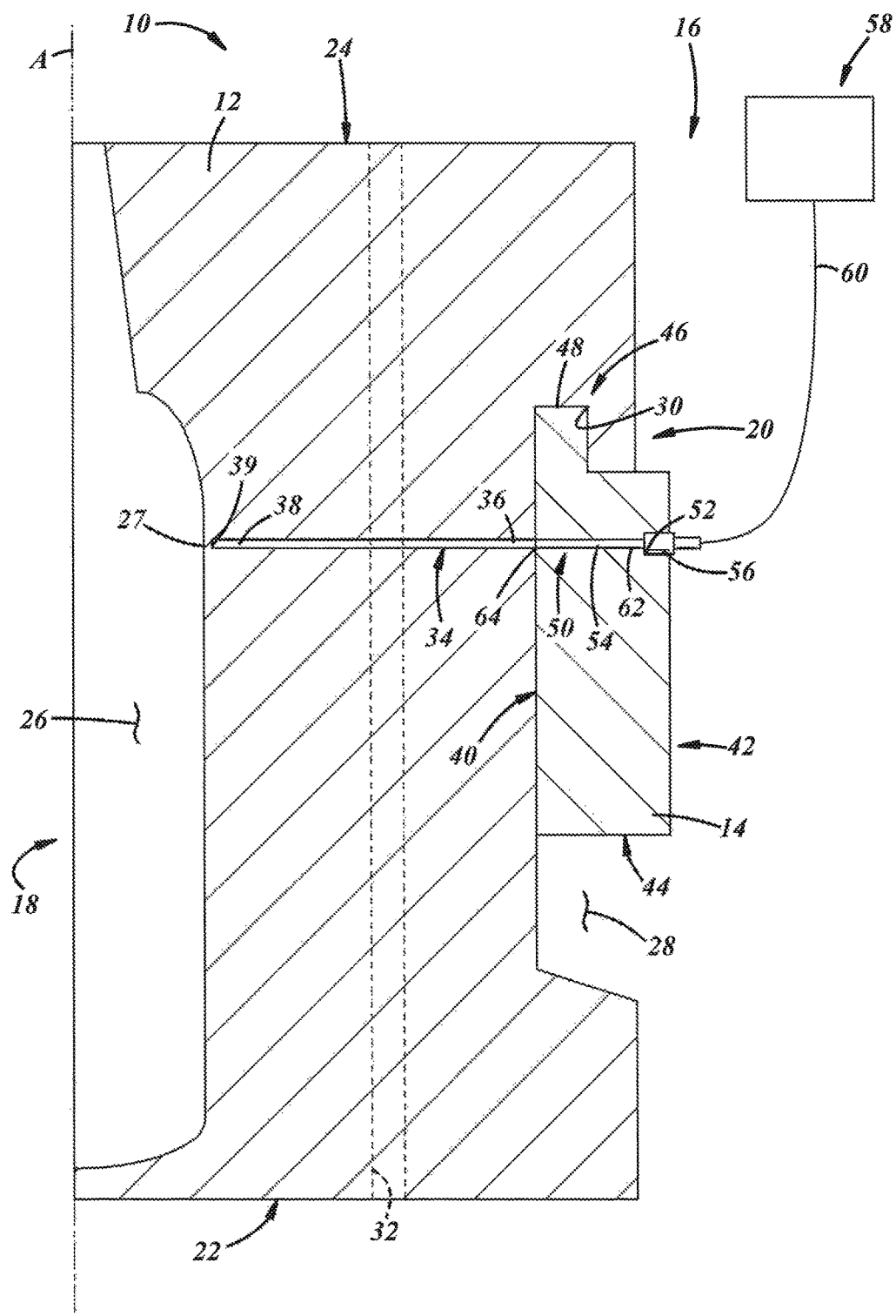

US 9,546,908 B1

GLASSWARE MOLD PYROMETRY

The present disclosure is directed to glassware manufacturing and, more particularly, to measuring temperatures of molds for forming glassware.

BACKGROUND AND SUMMARY OF THE DISCLOSURE

Glassware articles, for instance, glass containers, are typically molded at two stations of a forming machine of the type known as an individual section (I.S.) machine. In a blank station, a molten gob of glass is received and molded into a parison of a finished container by a blank mold including separable blank mold sections (e.g., halves) that are moved together to define a blank mold cavity for forming the parison. After forming of the parison, the blank mold sections are separated, and an invert mechanism transfers the glass parison to a blow station that includes a blow mold body that has separable blow mold sections (e.g. halves) that are moved together to define a blow mold cavity for forming the finished glassware container shape. In the blow station, the parison is received into the blow mold cavity and blow molded into the finished container shape by a blow mold operation. After forming of the finished container, the blow mold sections are separated and a take-out mechanism removes the formed container from the I.S. machine for further processing. The I.S. machine also includes mold hangers for mounting and carrying the mold sections. A U.S. patent that illustrates a machine of this type for molding glass containers is U.S. Pat. No. 7,698,907.

A general object of the present disclosure, in accordance with one aspect of the disclosure, is to provide an apparatus to measure the temperature of a glassware mold that is more reliable and less susceptible to damage compared to a conventional thermocouple or infrared camera.

The present disclosure embodies a number of aspects that can be implemented separately from or in combination with each other.

In accordance with one aspect of the disclosure, an apparatus is provided to sense temperature in a glassware forming machine. The apparatus includes a mold body including an exterior surface, a mold cavity having an interior mold surface, and a blind hole having a closed end including a closed end surface adjacent to and spaced outwardly from the interior mold surface, wherein the blind hole extends outwardly from the closed end surface toward the exterior surface. The apparatus also includes a mold hanger on which the mold body is removably carried, and a light collector carried by the mold hanger to collect infrared light emitted within the blind hole.

In accordance with another aspect of the disclosure, a glassware forming apparatus includes a glassware mold body including a longitudinally extending inboard axis, an inboard side, an outboard side, a lower end, and an upper end, a mold cavity in the inboard side for forming a glassware article, and a blind hole in the glassware mold body extending outwardly toward an exterior surface of the mold body from a closed end surface of the blind hole adjacent to an interior surface of the mold body cavity. Also, the apparatus includes a mold hanger disposed at the outboard side of the mold body and on which the mold body is removably carried and including an inboard side, an outboard side, a lower end, and an upper end, and a hanger hole extending between the outboard side and the inboard side in alignment with the blind hole of the mold body. Additionally, the apparatus includes a pyrometric apparatus including a pyrometer, and a light collector at least partially disposed in the hanger hole to collect infrared light from the blind hole for transmission to the pyrometer.

BRIEF DESCRIPTION OF THE DRAWINGS

The disclosure, together with additional objects, features, advantages and aspects thereof, will be best understood from the following description, the appended claims and the accompanying drawing, in which:

FIG. 1 is a schematic sectional view of a mold body, a mold hanger to carry the mold body, and a mold pyrometric apparatus in accordance with an illustrative embodiment of the present disclosure.

DETAILED DESCRIPTION OF PREFERRED EMBODIMENTS

FIG. 1 illustrates a portion of a blow mold station 10 of a glassware forming machine, that is used to produce glassware and is similar to that disclosed in U.S. Pat. No. 7,698,907, which is assigned to the assignee hereof and incorporated herein by reference, except for features of the present disclosure, which will be described in detail below. The station 10 includes a mold section or body 12, and a mold hanger 14 on which the mold body 12 may be removably carried. In accordance with the present disclosure, the station 10 also includes a pyrometric apparatus 16 to measure a temperature of the mold body 12. For example, the pyrometric apparatus 16 may measure a temperature of a mold wall to provide temperature data for adjusting a glassware manufacturing process in any suitable manner. Although the present disclosure is described and illustrated with respect to a blow mold station, those of ordinary skill in the art will understand that the present disclosure is also applicable to a blank mold station, a blank mold body, and a blank mold hanger.

The mold body 12 includes a longitudinally extending inboard axis A, an inboard side 18, an outboard side 20, a lower end 22, and an upper end 24. The mold body 12 also includes a mold cavity 26 in the inboard side 18 that partially establishes a complete molding cavity (not shown) for forming a glassware article, and a hanger recess 28 at the outboard side 20 and including a groove portion 30 to accept a corresponding portion of the hanger 14. The mold body 12 further may include a cooling wind passage 32 that may extend longitudinally, for example, parallel to the axis A, between the lower and upper ends 22, 24.

The mold body 12 additionally includes a blind passageway, pocket, or blind hole 34 in the outboard side 20 of the mold body 12 and extending between the sides 18, 20. The blind hole 34 may extend transversely with respect to the axis A. The term "transverse" is used herein according to its ordinary and customary meaning: lying across. Accordingly, the blind hole 34 may lie or extend at any non-parallel angle with respect to the axis A and not just the perpendicular and radial orientation shown in the illustrated embodiment. The blind hole 34 does not actually intersect the cooling wind passage 32 and is circumferentially spaced therefrom about the axis A. The blind hole 34 may be drilled, laser drilled, cast, or otherwise machined or formed, or provided in any other suitable manner.

The blind hole 34 includes an open end 36 at an exterior or outboard side 20 of the mold body 12 and, more specifically, within the hanger recess 28 of the mold body 12. The blind hole 34 also includes a closed end 38 opposite the open end 36 and located at the inboard side 18 of the mold body 12. The closed end 38 of the blind hole 34 includes a closed end surface 39 that is spaced outwardly from a corresponding interior mold surface 27 of the mold cavity 26. In the illustrated example, the closed end surface 39 is located closer to an upper end of a container body portion of the mold surface 27 than to a lower end thereof and, more particularly, is located proximate to a container shoulder portion of the mold surface 27.

The thickness of the mold body 12 at the closed end 38, or, stated another way, the distance from the closed end surface 39 to the corresponding interior mold surface 27 of the mold cavity 26, may be at least two millimeters (mm) and, may be two to twenty mm including all ranges and subranges therebetween, or may be any other suitable dimension. A diameter of the blind hole 34 may be one to ten mm including all ranges and subranges therebetween and, more specifically, may be about three mm, for instance, two to four mm including all ranges and subranges therebetween, or any other suitable size. A depth to diameter ratio of the blind hole may be at least 4:1 and, as exemplified in the drawing FIGURE, may be about 40:1, for instance, 20:1 to 80:1 including all ranges and subranges therebetween.

The hanger 14 may be at least partially carried in the hanger recess 28 of the mold body 12, and may include an inboard side 40, an outboard side 42, a lower end 44, and an upper end 46 that may have a tongue portion 48 for insertion in the groove portion 30 of the mold body 12. The hanger 14 includes a passageway or hanger hole 50 that extends between the outboard side 42 and the inboard side 40 and that is coaxially aligned with the blind hole 34 of the mold body 12. In the illustrated embodiment, the hanger hole 50 is a through hole extending through the sides 40, 42 and includes a counterbore 52 at the outboard side 42. In any case, the hanger hole 50 may be threaded at the outboard side 42 with or without the counterbore 52. In other embodiments, the hanger hole 50 may be a blind hole, a counterbore, or a pocket provided in the inboard side 40 of the hanger 14 in alignment with the blind hole 34.

Accordingly, the station 10 includes a combined pocket or blind port 34/50 for the pyrometric apparatus 16 that includes the blind hole 34 within the mold body 12 and at least a portion of the hanger hole 50 of the hanger 14 aligned with the blind hole 34 and extending from the closed end surface 39 of the mold body 12 and through the outboard side 20 of the mold body 12 and at least partially through the hanger 14. Any suitable seal, gasket, pilot features, and/or the like may be used between the mold hanger 14 and the mold body 12, particularly at the interface proximate the hanger hole 50 and the mold blind hole 34.

The pyrometric apparatus 16 includes a light collector 54 carried by the mold hanger 14 to collect infrared light from the blind hole 34 for transmission to a pyrometer 58. The apparatus 16 also may include a coupler 56 to couple the collector 54 to the hanger 14, the pyrometer 58, and an optical conduit 60 in optical communication with and between the collector 54 and the pyrometer 58. The collector 54 and the optical conduit 60 may include fiber optics and, the pyrometric apparatus 16 may be a fiber optic type of apparatus including any suitable fiber optic components. The light collector 54 may be part of a light sensor or light transmitter and, in any case, collects infrared light emitted within the blind hole 34, for example, from the closed end surface 39 and/or any other suitable surfaces within the blind hole 34.

The light collector 54 may be carried by the hanger 14 in the hanger hole 50 of the hanger 14, as shown in the illustrated embodiment. The light collector 54 may include a light pipe, for instance, a sapphire light pipe, which may be carried in the hanger hole 50 in a snug, and not loose, manner, for example, according to an interference fit, or at least a transitional fit. The light collector 54 also may be coupled to the hanger 14 by the coupler 56, which may be threaded into a threaded portion of the outboard end of the hanger hole 50, or may be coupled thereto in any other suitable manner. In any case, the light collector 54 may have a fixed end 62 at the coupler 56, and has a free end 64 opposite the fixed end 62.

The light collector 54 may be carried by the hanger 14 in such a manner that the free end 64 does not extend into the blind hole 34 of the mold body 12. In one embodiment, the free end 64 may be substantially flush with an immediately adjacent inboard surface at the inboard side 40 of the hanger 14. As used herein the term "substantially" includes allowance for manufacturing tolerances and includes a situation in which a flush condition is a target condition with a one-sided tolerance to allow for a slightly recessed condition but not a protruding condition. In another embodiment, the free end 64 may be recessed 6 to 8 mm, including all ranges and subranges therebetween, from the hanger inboard surface 40. In any case, the blind port 34/50 serves as a blackbody suitable for pyrometric measurement and that emits infrared energy that is collected by the light collector 54 and transmitted by the optical conduit 60 to the pyrometer 58.

The pyrometer 58 may be a device remote from the mold 12, a dedicated device local to the mold 12, a transportable handheld device, or of any other suitable configuration. The pyrometer 58 may include any suitable pyrometric sensors and other electronics, and suitable software and/or firmware, to convert collected infrared energy to digitally storable temperature data that can be used for mold monitoring and/or as a molding process control feedback signal.

In contrast to prior approaches that use contact-type thermocouples or infrared camera measurements of mold cavity surfaces, the presently disclosed apparatus may provide more reliable and repeatable results. For example, the collector 54 is located in a place that has a relatively stable operating temperature and that is more consistent from one set of mold bodies to another and, yet, may be adjusted for various mold designs, jobs, and materials. The mold blind hole 34 may be precision machined at a specific location on the mold body 12, both axially and circumferentially, and to a specific depth to maintain a distance from the mold cavity surface 27 to provide a standardized location for each specific set of mold bodies, thus providing a reproducible location from which to measure mold temperatures. Furthermore, various types of sets of mold bodies may have the blind hole 34 precision drilled to the same distance from the mold cavity surface 27 (i.e., the same mold wall thickness) to provide standardized temperature readings for multiple container shapes. Also, multiple blind holes could be provided in the mold body 12 and hanger 14 to provide temperature readings at various locations along the longitudinal axis A of the mold body 12 to provide temperature data for critical features of a glass container which may allow more precise forming and cooling processes. Such configurations may provide more repeatable temperature measurements, compared to reading temperature from an approximate location on a mold cavity surface when a mold body is in an open condition wherein mold bodies are moved apart from each other. Because the collector 54 is located in the mold hanger 14, the removal and replacement of mold bodies 12 does not affect the collector placement and also, the collector 54 may be less susceptible to damage by mold cleaning, mold removal and replacement, and the like.

Moreover, a conventional thermocouple and/or infrared camera is/are not required and, preferably, are not used.

There thus has been disclosed a pyrometric apparatus for measuring mold temperature, that fully satisfies all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. Apparatus to sense temperature in a glassware forming machine, comprising:
    a mold body including a longitudinally extending inboard axis, an inboard side, an outboard side, a lower end, and an upper end, a hanger recess at the outboard side, an exterior surface, a mold cavity having an interior mold surface, and a blind hole having a closed end including a closed end surface adjacent to and spaced outwardly from the interior mold surface, wherein the blind hole extends outwardly from the closed end surface toward the exterior surface and includes an open end in the outboard side of the mold body within the hanger recess;
    a mold hanger on which the mold body is removably carried, wherein the mold hanger is at least partially carried in the hanger recess of the mold body and includes an inboard side, an outboard side, a lower end, and an upper end, and a hanger hole that extends between the outboard side and the inboard side and is aligned with the blind hole of the mold body; and
    a light collector carried by the mold hanger to collect infrared light emitted within the blind hole.

2. The apparatus set forth in claim 1 wherein the blind hole extends radially with respect to the axis.

3. The apparatus set forth in claim 1 wherein the light collector is at least partially disposed in the hanger hole.

4. The apparatus set forth in claim 3 wherein the hanger hole is a through hole extending between the inboard and outboard sides of the hanger and the light collector is coupled to the hanger at an outboard end of the hanger through hole.

5. The apparatus set forth in claim 1 wherein the light collector includes a light pipe.

6. The apparatus set forth in claim 5, wherein the light pipe is a sapphire light pipe.

7. The apparatus set forth in claim 1 wherein the light collector has a free end and is carried in such a manner that the free end does not extend into the blind hole of the mold body.

8. The apparatus set forth in claim 7 wherein the free end is substantially flush with and immediately adjacent the inboard surface of the inboard side of the hanger.

9. The apparatus set forth in claim 1 wherein the blind hole has a depth to diameter ratio of at least 4:1, wherein the diameter of the blind hole is two to four mm.

10. The apparatus set forth in claim 1 wherein the thickness of the mold body in a location between the interior mold surface and the closed end surface is at least two millimeters.

11. A glassware forming apparatus that includes:
    a glassware mold body including a longitudinally extending inboard axis, an inboard side, an outboard side, a lower end, and an upper end, a mold cavity in the inboard side for forming a glassware article, and a blind hole in the glassware mold body extending outwardly toward an exterior surface of the mold body from a closed end surface of the blind hole adjacent to an interior surface of the mold body cavity;
    a mold hanger disposed at the outboard side of the mold body and on which the mold body is removably carried and including an inboard side, an outboard side, a lower end, and an upper end, and a hanger hole extending between the outboard side and the inboard side in alignment with the blind hole of the mold body; and
    a pyrometric apparatus including a pyrometer, and a light collector at least partially disposed in the hanger hole to collect infrared light from the blind hole for transmission to the pyrometer.

12. The apparatus set forth in claim 11 wherein the blind hole extends radially with respect to the axis.

13. The apparatus set forth in claim 11 wherein light collector includes a light pipe.

14. The apparatus set forth in claim 13 wherein the light pipe is a sapphire light pipe.

15. The apparatus set forth in claim 11 wherein the hanger hole is a through hole extending between the inboard and outboard sides of the hanger and the light collector is coupled to the hanger at an outboard end of the hanger through hole.

16. The apparatus set forth in claim 11 wherein the light collector has a free end and is carried in such a manner that the free end does not extend into the blind hole of the mold body.

17. The apparatus set forth in claim 16 wherein the free end is substantially flush with and immediately adjacent the inboard surface of the inboard side of the hanger.

18. The apparatus set forth in claim 11 wherein the blind hole has a depth to diameter ratio of at least 4:1, wherein the diameter of the blind hole is two to four mm, and the thickness of the mold body in a location between the interior surface of the mold body and the closed end surface is at least two millimeters.

* * * * *